(12) United States Patent
Apone et al.

(10) Patent No.: US 10,531,761 B2
(45) Date of Patent: Jan. 14, 2020

(54) BEVERAGE PREPARATION SYSTEMS AND METHODS

(71) Applicant: Starbucks Corporation, Seattle, WA (US)

(72) Inventors: Dan Apone, Seattle, WA (US); Izaak Koller, Seattle, WA (US); Michael Cummer, Seattle, WA (US); William George Crossland, Seattle, WA (US)

(73) Assignee: Starbucks Corporation, Seattle, WA (US)

( * ) Notice: Subject to any disclaimer, the term of this patent is extended or adjusted under 35 U.S.C. 154(b) by 254 days.

(21) Appl. No.: 15/260,041

(22) Filed: Sep. 8, 2016

(65) Prior Publication Data

US 2017/0079464 A1 Mar. 23, 2017

Related U.S. Application Data

(60) Provisional application No. 62/220,577, filed on Sep. 18, 2015.

(51) Int. Cl.
*A47J 31/44* (2006.01)
*A47J 31/40* (2006.01)
(Continued)

(52) U.S. Cl.
CPC .............. *A47J 31/40* (2013.01); *A23L 2/54* (2013.01); *A23L 5/13* (2016.08); *A23P 30/40* (2016.08);
(Continued)

(58) Field of Classification Search
CPC ............... A47J 31/4457; A47J 31/4482; A47J 31/4489; A47J 31/4485; A47J 31/4492;
(Continued)

(56) References Cited

U.S. PATENT DOCUMENTS 784,755 A * 3/1905 Pein
1,460,094 A * 6/1923 Cunneen ............. A47L 15/0065
134/167 R
(Continued)

FOREIGN PATENT DOCUMENTS

BE 20145074 1/2016
EP 1955623 A1 8/2008
(Continued)

OTHER PUBLICATIONS

Invitation to Pay Additional Fees in corresponding International Patent Application No. PCT/US2016/051339, dated Nov. 28, 2016, in 2 pages.
(Continued)

*Primary Examiner* — Drew E Becker
(74) *Attorney, Agent, or Firm* — Knobbe, Martens, Olson & Bear, LLP

(57) ABSTRACT

Various beverage preparation systems and methods are disclosed. The beverage preparation system can include a container manipulation assembly having a support assembly and an elevator. The support assembly can be configured to receive a container. The elevator can be connected with the support assembly and can be configured to translate and/or rotate the support assembly. In some embodiments, the beverage preparation system includes a wand manipulation assembly having a wand unit and a mechanical linkage. The linkage can be configured to move the wand unit into and out of engagement with the container on the support assembly. The wand unit can provide a flow of fluid, such as steam, to liquid in the container to heat and/or froth the liquid.

15 Claims, 15 Drawing Sheets

(51) Int. Cl.
    *A47J 31/60*     (2006.01)
    *A23L 2/54*     (2006.01)
    *A23L 5/10*     (2016.01)
    *A23P 30/40*     (2016.01)

(52) U.S. Cl.
    CPC ......... *A47J 31/441* (2013.01); *A47J 31/4403* (2013.01); *A47J 31/4485* (2013.01); *A47J 31/4489* (2013.01); *A47J 31/4496* (2013.01); *A47J 31/60* (2013.01); *A23C 2210/30* (2013.01)

(58) Field of Classification Search
    CPC .......... A47J 31/4496; A47J 31/52–5255; A47J 31/60; A47J 31/441–4453; A23L 2/54; A23L 5/13; A23C 2210/30; A23P 30/40; A23G 9/30
    USPC .......................................... 426/510–511, 569
    See application file for complete search history.

(56) References Cited

U.S. PATENT DOCUMENTS

| | | | |
|---|---|---|---|
| 2,127,883 A * | 8/1938 | Norton | B05B 1/3421 239/497 |
| 2,251,059 A * | 7/1941 | Lau | A47L 15/0065 134/54 |
| 2,748,411 A * | 6/1956 | O'Brien | A47L 11/38 15/248.1 |
| 2,762,656 A * | 9/1956 | Fraser | F23D 11/007 239/404 |
| 3,045,926 A * | 7/1962 | Steinen | B05B 1/265 239/457 |
| 3,180,375 A | 4/1965 | Fechheimer | |
| 3,345,933 A * | 10/1967 | Valente | A47J 31/3614 134/131 |
| 3,920,149 A | 11/1975 | Fortino et al. | |
| 3,987,715 A * | 10/1976 | Muller | A47J 31/00 99/275 |
| 4,316,727 A * | 2/1982 | Hegemann | B01D 47/10 96/27 |
| 4,523,083 A * | 6/1985 | Hamilton | A47J 36/2461 206/818 |
| 4,827,904 A * | 5/1989 | Bonanno | A47J 31/4489 126/348 |
| 4,911,212 A | 3/1990 | Burton | |
| 5,205,306 A * | 4/1993 | Peterson | A47K 3/287 134/104.2 |
| 5,299,433 A * | 4/1994 | Harms | A47G 19/12 62/457.2 |
| 5,650,186 A | 7/1997 | Annoni et al. | |
| 5,865,104 A | 2/1999 | Sham et al. | |
| 6,019,032 A | 2/2000 | Arksey | |
| 6,220,147 B1 | 4/2001 | Priley | |
| 6,293,187 B1 * | 9/2001 | Zils | A47J 31/4482 99/293 |
| 6,390,319 B1 * | 5/2002 | Yu | B65D 81/24 215/6 |
| 6,558,035 B2 | 5/2003 | Lane | |
| 6,889,603 B2 | 5/2005 | Carhuff et al. | |
| 7,121,287 B2 | 10/2006 | Carhuff et al. | |
| 7,318,372 B2 | 1/2008 | Cooke | |
| 8,356,461 B2 | 1/2013 | Cedrone | |
| 8,474,367 B2 | 7/2013 | Morin et al. | |
| 8,515,574 B2 * | 8/2013 | Studor | A47J 31/44 700/231 |
| 8,763,655 B2 | 7/2014 | Springer | |
| 8,777,182 B2 | 7/2014 | Springer | |
| 8,899,281 B2 | 12/2014 | Russell | |
| 8,941,455 B2 * | 1/2015 | Alexander | B60R 11/00 24/303 |
| 8,960,079 B2 | 2/2015 | Gugerli et al. | |
| 8,991,795 B2 | 3/2015 | Studor et al. | |
| 9,398,821 B1 * | 7/2016 | Long | A47G 19/12 |
| 10,258,191 B2 | 4/2019 | Apone et al. | |
| 10,362,896 B2 | 7/2019 | Apone et al. | |
| 2002/0023543 A1 | 2/2002 | Schmed | |
| 2004/0173719 A1 * | 9/2004 | Mitchell | A47G 23/0225 248/311.2 |
| 2005/0115419 A1 | 6/2005 | Oldani et al. | |
| 2005/0145717 A1 * | 7/2005 | Katz | A47L 15/0065 239/279 |
| 2005/0174884 A1 * | 8/2005 | Farrell | B01F 7/1605 366/347 |
| 2006/0140595 A1 | 6/2006 | Grabowski | |
| 2007/0181003 A1 | 8/2007 | Bardazzi | |
| 2007/0187421 A1 * | 8/2007 | Constantine | A47J 31/44 220/573.1 |
| 2007/0209521 A1 | 9/2007 | Boussemart et al. | |
| 2008/0169048 A1 | 7/2008 | Windmiller | |
| 2008/0223478 A1 | 9/2008 | Hantsoo et al. | |
| 2009/0266245 A1 | 10/2009 | Kanuma et al. | |
| 2010/0047407 A1 * | 2/2010 | Carbonini | A47J 31/4489 426/231 |
| 2010/0064899 A1 | 3/2010 | Aardenburg | |
| 2010/0151092 A1 * | 6/2010 | Sus | A47J 29/02 426/231 |
| 2010/0170838 A1 * | 7/2010 | Falcone | B03C 1/286 210/222 |
| 2010/0192785 A1 | 8/2010 | Krauchi et al. | |
| 2010/0193528 A1 | 8/2010 | Davidson | |
| 2010/0263545 A1 | 10/2010 | Morgan et al. | |
| 2011/0048462 A1 * | 3/2011 | Morin | A47J 31/4489 134/22.11 |
| 2011/0232501 A1 | 9/2011 | Kroesen et al. | |
| 2011/0256287 A1 * | 10/2011 | Sus | A47J 27/16 426/510 |
| 2012/0305597 A1 | 12/2012 | Larzul et al. | |
| 2013/0087050 A1 | 4/2013 | Studor et al. | |
| 2013/0118639 A1 | 5/2013 | Springer | |
| 2013/0213960 A1 * | 8/2013 | Cook | A47G 19/2205 220/23.87 |
| 2013/0240079 A1 * | 9/2013 | Petrini | B67D 1/0003 141/1 |
| 2014/0020566 A1 | 1/2014 | Stieger | |
| 2014/0123858 A1 * | 5/2014 | Rellis | A47J 31/46 99/293 |
| 2014/0123859 A1 | 5/2014 | Verbeek | |
| 2014/0166524 A1 | 6/2014 | Springer | |
| 2014/0182744 A1 | 7/2014 | Shaffer | |
| 2014/0263430 A1 | 9/2014 | Keating et al. | |
| 2014/0264972 A1 * | 9/2014 | Studor | B01F 3/04446 261/121.1 |
| 2014/0283877 A1 * | 9/2014 | Sonoda | A47L 15/0065 134/22.1 |
| 2015/0104548 A1 * | 4/2015 | Yip | A47J 31/4489 426/231 |
| 2015/0108169 A1 | 4/2015 | Bishel | |
| 2015/0150408 A1 * | 6/2015 | Schlee | B01F 5/0413 426/474 |
| 2015/0284163 A1 | 10/2015 | Manwani et al. | |
| 2015/0336736 A1 | 11/2015 | Cabilli | |
| 2016/0045063 A1 * | 2/2016 | Mantle | A47J 31/60 99/275 |
| 2016/0058238 A1 * | 3/2016 | Purton | A47J 31/4489 261/130 |
| 2016/0235243 A1 * | 8/2016 | Grassia | A47J 31/4489 |
| 2016/0284153 A1 * | 9/2016 | Tansey, Jr. | G07F 13/10 |
| 2017/0079468 A1 | 3/2017 | Apone et al. | |
| 2017/0079469 A1 | 3/2017 | Apone et al. | |
| 2017/0127872 A1 * | 5/2017 | Dumur | A47J 31/0668 |
| 2017/0359996 A1 * | 12/2017 | Adriaens | A47J 31/4489 |
| 2018/0098653 A1 * | 4/2018 | Pinchuk | A47G 19/2261 |
| 2018/0160846 A1 * | 6/2018 | Ceotto | A47J 31/4489 |

(56) References Cited

U.S. PATENT DOCUMENTS

| | | | |
|---|---|---|---|
| 2018/0213968 A1* | 8/2018 | Purton | A47J 31/4489 |
| 2019/0223654 A1 | 7/2019 | Apone et al. | |

FOREIGN PATENT DOCUMENTS

| | | |
|---|---|---|
| EP | 2272408 A1 | 1/2011 |
| EP | 2353473 A1 | 8/2011 |
| EP | 2353474 A1 | 8/2011 |
| GB | 2476066 A | 6/2011 |
| JP | H06-078852 A | 3/1994 |
| JP | H07-100063 A | 4/1995 |
| JP | 2003-070644 A | 3/2011 |
| WO | WO 00/19875 A1 | 4/2000 |
| WO | WO 2006/075322 A2 | 7/2006 |
| WO | WO 2008/049162 A1 | 5/2008 |
| WO | WO 2011/106259 A1 | 9/2011 |
| WO | WO 2014/036697 A1 | 3/2014 |
| WO | WO 2014/075833 A2 | 5/2014 |
| WO | WO 2014/086915 A1 | 6/2014 |
| WO | WO 2016/079680 A1 | 5/2016 |
| WO | WO 2017/048637 A1 | 3/2017 |
| WO | WO 2017/048639 A1 | 3/2017 |

OTHER PUBLICATIONS

International Search Report and Written Opinion in corresponding International Patent Application No. PCT/US2016/051339, dated Jan. 19, 2017, in 13 pages.
Carlsen, Zachary, "Set Steam Wand to Stun: Automated Milk Frother," http:/sprudge.com/set-steam-wand-to-stun-automated-milk-frother-118451.html, Apr. 8, 2017, in 8 pages.
O2perfectfoam, "Hello I am the Smart Full-Automatic Frother for Bars & Baristas," Jan. 15, 2016, in 7 pages.
Partial Search Report in corresponding European Patent Application No. 16847109.2, dated Mar. 28, 2019, in 10 pages.
Office Action in corresponding Colombian Patent Application No. NC2018/0003011, dated Jun. 18, 2019, in 12 pages.
Extended Search Report in corresponding European Patent Application No. 16847109.2, dated Jun. 13, 2019, in 10 pages.

* cited by examiner

BEVERAGE PREPARATION SYSTEMS AND METHODS

CROSS REFERENCE

This application claims a priority benefit under 35 U.S.C. § 119 of U.S. patent application Ser. No. 62/220,577, filed Sep. 18, 2015, the entirety of which is hereby incorporated by reference herein.

BACKGROUND

Field

The present disclosure relates to systems and methods for preparing beverages, such as systems and methods for preparing heated frothed milk.

Description of Certain Related Art

Certain beverages, such as lattes and cappuccinos, are prepared with heated frothed milk. Heated frothed milk is typically obtained by heating milk while injecting fluid into it. For example, a wand can be inserted into a volume of milk and steam can be passed through the wand and into the milk, thereby heating and frothing the milk. This can yield an upper layer of milk foam and a lower layer of milk liquid with a rich taste.

BRIEF DESCRIPTION OF THE DRAWINGS

Various embodiments are depicted in the accompanying drawings for illustrative purposes, and should in no way be interpreted as limiting the scope of the embodiments. Various features of different disclosed embodiments can be combined to form additional embodiments, which are part of this disclosure.

DETAILED DESCRIPTION OF CERTAIN EMBODIMENTS

Various beverage dispenser systems and methods are described below to illustrate various examples that may achieve one or more desired improvements. These examples are only illustrative and not intended in any way to restrict the general disclosure presented and the various aspects and features of this disclosure. The general principles described herein may be applied to embodiments and applications other than those discussed herein without departing from the spirit and scope of the disclosure. Indeed, this disclosure is not limited to the particular embodiments shown, but is instead to be accorded the widest scope consistent with the principles and features that are disclosed or suggested herein.

Although certain aspects, advantages, and features are described herein, it is not necessary that any particular embodiment include or achieve any or all of those aspects, advantages, and features. For example, some embodiments may not achieve the advantages described herein, but may achieve other advantages instead. Any structure, feature, or step in any embodiment can be used in place of, or in addition to, any structure, feature, or step in any other embodiment, or omitted. This disclosure contemplates all combinations of features from the various disclosed embodiments. No feature, structure, or step is essential or indispensable.

Figure 1A:
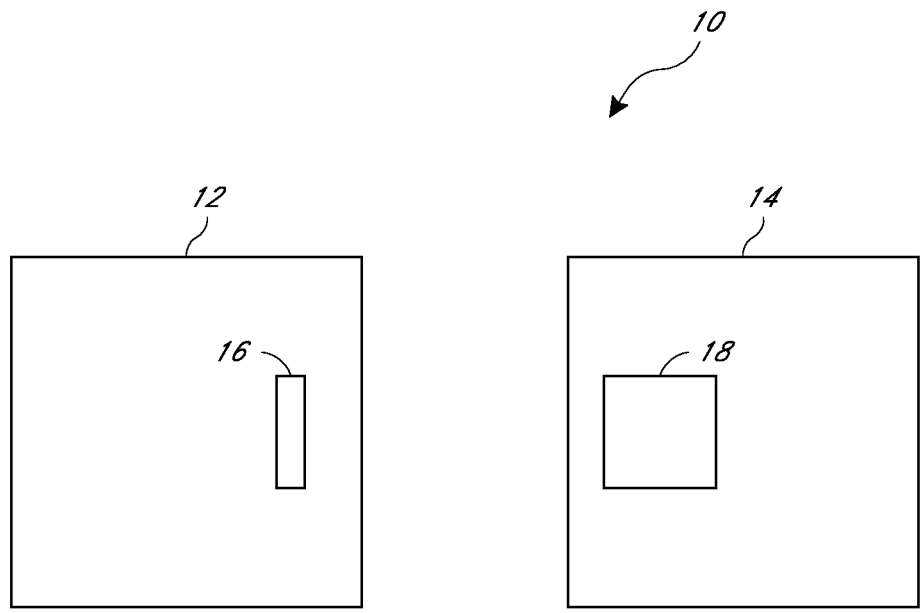
FIGS. 1A and 1B schematically illustrate an embodiment of a beverage preparation system.
Figure 1B:
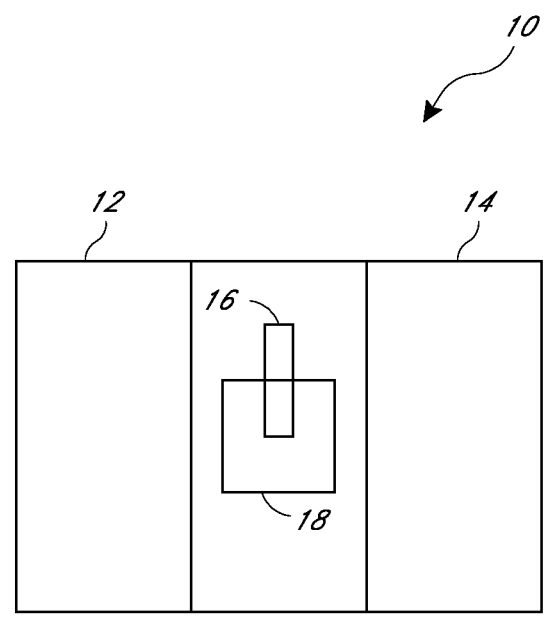

Overview (FIGS. 1A and 1B)

FIGS. 1A and 1B schematically illustrate an embodiment of a beverage preparation system 10. As shown, the system 10 can include a wand manipulation assembly 12 and a container manipulation assembly 14. The wand manipulation assembly 12 can include a wand unit 16, such as a steam wand. The wand unit 16 can be configured to be partially submerged in a liquid (e.g., milk) in a container 18 and to introduce a flow of fluid (e.g., steam) into the liquid, thereby heating and frothing the liquid. The container manipulation assembly 14 can be configured to receive and support the container 18, such as a pitcher, cup, or other vessel, which can hold the liquid to be heated and frothed. In some embodiments, the container manipulation assembly 14 is configured to translate and/or rotate the container 14.

As schematically shown in FIG. 1A, in some operational states, the wand manipulation assembly 12 and the container manipulation assembly 14 are disengaged from each other. For example, as illustrated, in some states, the wand unit 16 and the container 18 are separated (e.g., spaced apart) from each other. As schematically shown in FIG. 1B, in certain operational states, the wand manipulation assembly 12 and the container manipulation assembly 14 are engaged (e.g., interfaced) with each other. For example, as illustrated, in some states, a portion of the wand unit 16 can be received in the container 18, such as to facilitate heating and/or frothing of the liquid in the container 18. Some embodiments are configured to cycle between the disengaged and engaged states, such as directly or with one or more additional processes.

In certain embodiments, the wand manipulation assembly 12 and/or the container manipulation assembly 14 are distinct from, and not a part of, a beverage machine. For example, the wand manipulation assembly 12 can be distinct from (e.g., spaced apart from) an espresso machine. In certain variants, the wand manipulation assembly 12 is spaced apart from an espresso machine, yet is configured to receive steam from the espresso machine via tubing.

Figure 2A:
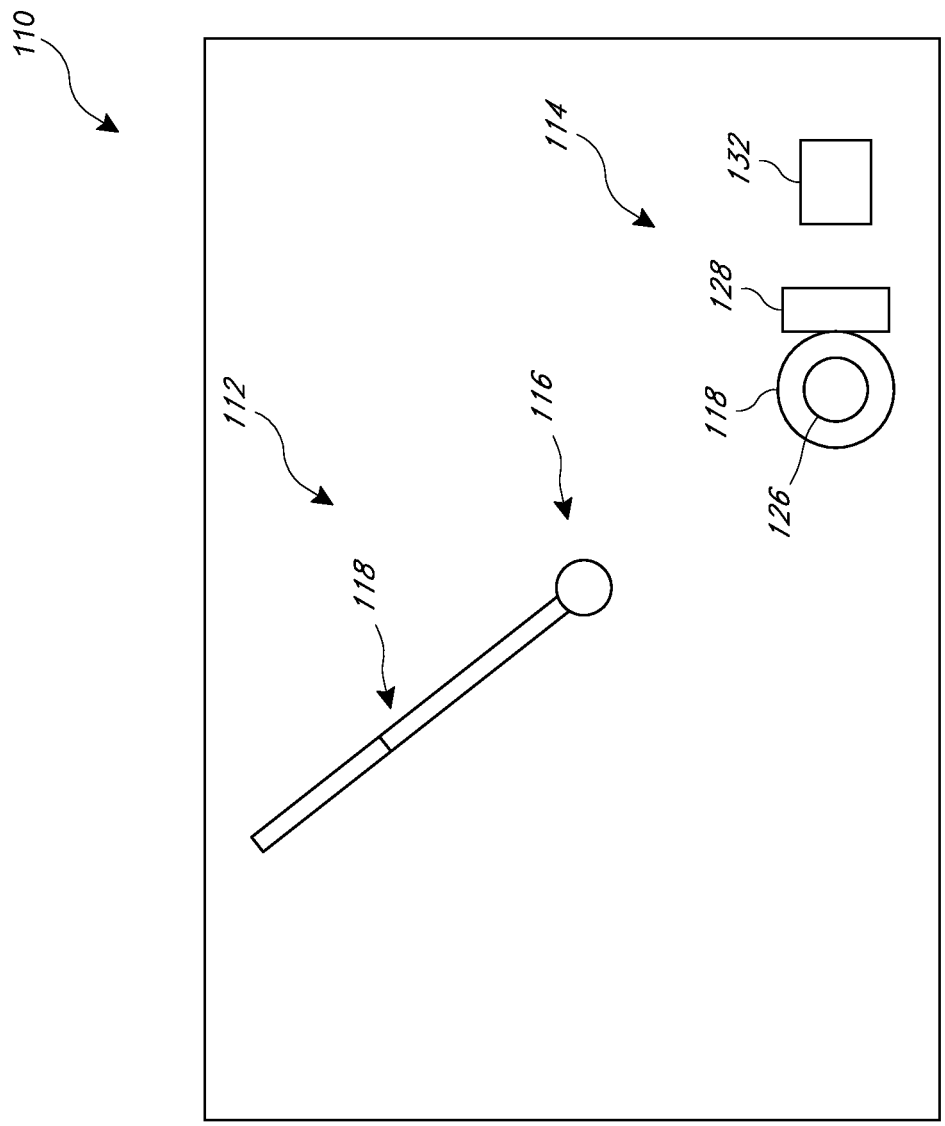
FIGS. 2A and 2B illustrate top and side views of another embodiment of a beverage preparation system.
Figure 2B:
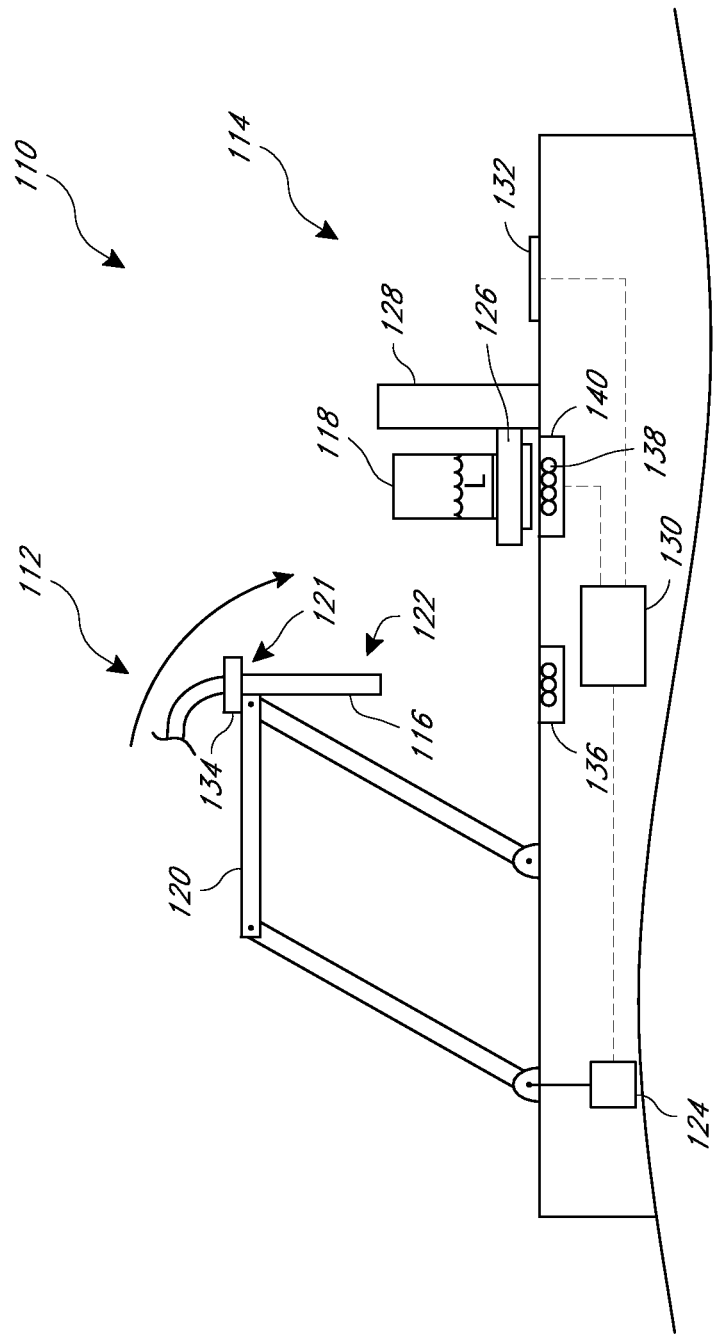

Example Beverage Preparation System (FIGS. 2A and 2B)

FIGS. 2A and 2B illustrate another embodiment of a beverage preparation system 110. To facilitate presentation, the system 110 is discussed in connection with preparing a heated frothed milk beverage. However, various embodiments can be applied in many other contexts as well, such as in preparing brewed coffee, tea, juice, alcohol, and other types of beverages. Many of the features of the system 110 are the same as, or similar to, the features described above in connection with the system 10. To illustrate such correspondence, many of the numerals used to identify features of the system 110 are incremented by a factor of one hundred relative to the numerals used in connection with the system 10. The system 110 can include one, some, or all of the features of the system 10, including all combinations and sub combinations. Any component or step disclosed in any embodiment in this specification can be used in other embodiment.

As illustrated, the system 110 can include a wand manipulation assembly 112 and a container manipulation assembly 114. The wand manipulation assembly 112 and/or the container manipulation assembly 114 can be mounted on a counter, such as a countertop of a coffee shop. In various embodiments, the wand manipulation assembly 112 and/or the container manipulation assembly 114 can be generally visible from both a first side of the counter (e.g., a store employee side) and an opposite second side (e.g., a customer side). Thus, certain embodiments can enable customers to visually experience the operation of the system 110.

As is discussed in more detail below, the wand manipulation assembly 112 can be configured to introduce a wand unit 116 into a container 118, such as a pitcher, cup, or other vessel. This can facilitate heating and foaming liquid L (e.g., milk) in the container 118. Some embodiments are configured to withdraw the wand unit 116 out of the container 118, which can facilitate access to the container 118 by a user. In certain implementations, the container manipulation assembly 114 can be configured to support and move the container 118. For example, the container 118 can be moved up and down relative to the wand unit 116 and/or a countertop. In some embodiments, the container manipulation assembly 114 is configured to rotate the container 118, such as to a position to enable washing of the inside of the container 118.

As illustrated, the wand manipulation assembly 112 can include a wand unit 116 coupled with a linkage 120 that is supported by a base, such as the counter. The wand unit 116 can comprise a generally elongate device with a longitudinal channel. A first end 121 of the wand unit 116 can be connected with a fluid source (not shown), such as a source of steam, and can be configured to convey the fluid through the longitudinal channel. A second end 122 (also called the "tip") of the wand unit 116 can include an opening through which the fluid may be dispensed. Thus, when the second end 122 of the wand unit 116 is partially or completely submerged in liquid in the container, the fluid (e.g., steam) may be discharged from the wand unit 116 and pass through the liquid to heat and/or froth the liquid. In certain embodiments, the wand unit 116 includes one or more sensors, such as temperature sensors, liquid sensors, proximity sensors, weight sensors, or otherwise. In some embodiments, the wand unit 116 includes one or more heating elements, such as electrical resistance heaters. In some implementations, the wand unit 116 is made of plastic (e.g., polyether ether keton) or metal (e.g., stainless steel).

Figure 3:
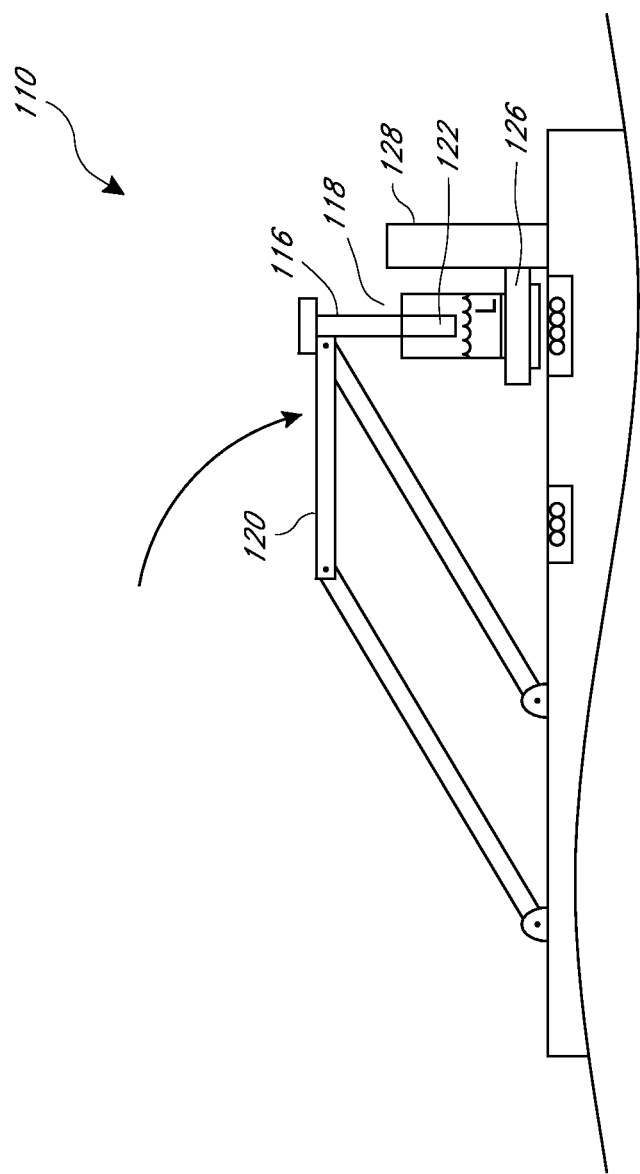
FIGS. 3-10 illustrate side views of the system of FIGS. 2A and 2B in various operational states.

The linkage 120 can be configured to move the wand unit 116. For example, the linkage 120 can be configured to introduce and withdraw the wand unit 116 into and out of the container 118. In some embodiments, the linkage 120 is configured to move the wand unit 116 vertically. For example, the linkage 120 can include a piston and/or telescoping member that descends to introduce the wand unit 116 into the container 118 and ascends to withdraw the wand unit 116 from the container 118. In some embodiments, the linkage 120 is configured to move the wand unit 116 vertically and horizontally. For example, as illustrated, the linkage 120 can move down and toward the container 118 to insert the wand unit 116 into the container 118 and can move up and away from the container 118 to remove the wand unit 116 from the container 118. In some embodiments, during the course of movement from a position outside the container 118 to a position inside the container 118, the tip 122 of the wand unit 116 travels in a curved path, such as an arced path from a side elevation perspective of the system 110 (e.g., as illustrated in FIG. 3). In some variants, the tip 122 travels in an arch such that the tip 122 moves upward for a portion of the travel and downward for another portion of the travel.

In some implementations, the system 110 is configured to move the wand unit 116 with a generally smooth motion. For example, the system 110 can move the wand unit 116 without jerking or distinct changes in direction. In some implementations, the linkage 120 comprises a four-bar linkage or another type of linkage that provides generally smooth motion. As illustrated, the linkage 120 can be operably coupled with a motor 124, such as a stepper motor. In certain implementations, the motor 124 can drive the linkage 120, which in turn can position the wand unit 116.

As mentioned above, the system 110 can include a container manipulation assembly 114. In some embodiments, the container manipulation assembly 114 can include a container 118 receiving feature and/or support assembly 126, such as a platform. The support assembly 126 can be configured to support the container 118. For example, as illustrated the support assembly 126 can comprise a generally planar tray on which the container 118 can be stably placed. In some implementations, from a top view, the support assembly 126 has a generally circular peripheral shape.

In some embodiments, the support assembly 126 and container 118 are configured to couple together, such as via magnetic coupling. For example, the container 118 can be secured to the support assembly 126 with one or more permanent magnets located on the container 118 and/or the support assembly 126. The strength of the coupling can be such that a user can readily overcome the coupling force, thereby allowing the container 118 to be removed from the support assembly 126. In certain embodiments, the container 118 is secured to the support assembly 126 by a mechanical coupling or other type of connection. For example, the container 118 can be clamped to the support assembly 126. In some variants, the support assembly 126 can include pins that are received in corresponding slots in the container 118, such that in a first position the container 118 is secured with the support assembly 126 and in a second position the container 118 can be lifted off the support assembly 126. In some implementations, the container 118 and support assembly 126 can be coupled with a magnetic keyed collar and a fitting. For example, a magnetic keyed collar on the support assembly 126 can be configured to engage with a fitting attached to the side of the container 118. The support assembly 126 can be configured to engage with a top portion, side, and/or the bottom of the container 118.

Some embodiments are configured to control, or at least encourage, the orientation container 118 relative to the support assembly 126 (also called a "base"). This can aid in aligning features of the container with corresponding features of the base. In certain embodiments, the mating features facilitate the orientation. For example, in some variants in which the mating features comprise magnetic elements, the arrangement and polarity of the magnetic elements control the orientation of the container 118 relative to the base. In certain such embodiments, when the container 118 is placed on the base, the only orientation of the container 118 relative to the base in which each of the mating features engage with a mating feature of opposite polarity is the orientation in which the features engage. Accordingly, the orientation of the container 118 relative to the base can be controlled.

Certain variants use a physical interference to control, or at least encourage, the orientation of the container 118 relative to the base. In some embodiments, the container 118 and base can be keyed to mate in only a certain relative orientation. For example, the base can have a protrusion with a shape and the container 118 can have a recess with a corresponding shape, with the shape being such that the protrusion can only be received in the recess in a single certain orientation. In some embodiments, the shape is an irregular polygon. Certain implementations include a protrusion (e.g., a pin) that is offset from the center of the base and a recess (e.g., a slot) that is in a corresponding location offset from the center of the container 118.

In some embodiments, the system 110 is configured to introduce liquid into the interior of the container 118. For example, the system 110 can include at least one dispensing nozzle adapted to receive a flow of liquid (e.g., milk) from a source (e.g., a milk dispenser) and to dispense the liquid into the interior of the container 118. In some embodiments, the nozzle is configured to introduce the liquid through an open upper end of the container 118. In some embodiments, the nozzle is configured to introduce the liquid through a closed bottom end of the container 118. For example, engagement of the container 118 with the support assembly 126 can open a passage in the bottom of the container 118, through which the nozzle can introduce the liquid into the interior of the container 118. The passage can be closed when the container 118 is not engaged with the support assembly 126. In some embodiments in which the container 118 is transparent or translucent, introducing the liquid through the bottom of the container 118 can make it appear to an observer that the liquid is welling-up, growing, and/or rising within the container 118. In certain embodiments in which the container 118 is opaque, introducing the liquid through the bottom of the container 118 can allow the sides of the container 118 to hide, obscure, and/or mask the liquid from certain observers (e.g., a person who does not have a line of sight into the container 118 that is generally parallel to the longitudinal axis of the container 118). This can make it seem as if the liquid magically appeared in the container 118. In some embodiments, the container 118 and/or the nozzle include a backflow inhibitor, such as a check valve (e.g., an umbrella valve, duckbill valve, or otherwise). In various embodiments, the system 110 is configured to automatically introduce the liquid into the container 118 in response to the container 118 being engaged with the support assembly 126.

The support assembly 126 can be coupled with a positioning mechanism, such as an elevator 128. In some embodiments, the elevator 128 comprises a linear actuator. The elevator 128 can be configured to move the support assembly 126 relative to the countertop and/or wand unit 116. For example, in certain implementations, the elevator 128 moves the support assembly 126 generally vertically, such as between a lower position, upper position, and one or more intermediate positions.

As shown, the system 110 can include a controller 130, such as a processor and a memory. The controller 130 communicates with, and can be electrically connected with, other components of the system 110, such as via one or more cables or wires. In some embodiments, the controller 130 communicates with one or more other components wirelessly, such as via wi-fi, Bluetooth®, etc. The controller 130 can be configured to control various components of the system 110. For example, the controller 130 can instruct the motor 124 to drive the linkage 120, can instruct the fluid source to begin or end providing fluid to the wand unit 116, and/or can instruct the elevator 128 to move the support assembly 126 to various positions.

In some embodiments, the system 110 includes a user interface 132, which can be in communication with the controller 130. For example, the system 110 can include a keypad or other device configured to receive inputs from a user, such as one or more physical or virtual buttons or switches. The user inputs can include operational instructions, such as a command to initiate operation of the system 110. In certain variants, the user inputs include operational setpoints and/or parameters such as a temperature value (e.g., a temperature set point for the heated and/or frothed milk), a level of frothing vigorousness or desired foaminess, a time value, or otherwise. In some embodiments, the user inputs include a type of fluid in the container 118, such as whole milk, reduced fat milk (e.g., milk with 2% fat), soy milk, etc. Some implementations include a customer interface, such as an interface to display information relevant to the customer's beverage order (e.g., beverage type, type of milk, temperature, etc.).

In some embodiments, the user interface 132 can provide outputs to the user. For example, the user interface 132 can include a display (e.g., a screen), one or more lights (e.g., light emitting diodes), gages, graphs, timers, symbols or other indicia, or otherwise. The user interface 132 can indicate various information about the system 110, such as an indication of the state of the system (e.g., on or off), the current operational state and/or next operational state, time elapsed and/or remaining during an operational state, total time elapsed and/or remaining for the system 110 to complete a cycle of operational states, or otherwise.

As will be discussed in more detail below, some embodiments include features to facilitate cleaning of portions of the system 110. For example, in some embodiments, the wand manipulation assembly 112 can include a wand cleaning unit (e.g., a collar 134) and/or a wand drain 136. In some embodiments, the container manipulation assembly 114 includes a container cleaning unit (e.g., one or more nozzles 138) and/or a container drain 140.

Certain Operational States (FIGS. 3-10)

Certain embodiments of the system 110 include a preparatory, initial, and/or rest operational state. Such a state can be the operational state that the system 110 is in, and/or reverts to, when deenergized (e.g., turned off), upon being energized (e.g., turned on), and/or when the system 110 is energized and is not performing a task (e.g., a frothing or washing task). In some such embodiments, the preparatory, initial, and/or rest operational state is a state similar to what is shown in FIG. 1A and/or FIG. 2B. For example, in such a state, the wand manipulation assembly 112 and the container manipulation assembly 114 can be disengaged from each other.

FIGS. 3-10 illustrate various other operational states of certain embodiments of the system 110. As will be described in more detail, some implementations are configured to automatically insert the wand unit 116 into a container 118 of liquid (e.g., milk), heat and/or froth the liquid, and remove the wand unit 116 from the heated and/or frothed liquid. Some embodiments are configured to automatically cleanse the wand unit 116 and/or the container 118. The system 110 can include one or more position sensors configured to detect the location of various components, such as the position of the wand unit 116, linkage 120, container 118, support assembly 126, and/or elevator 128.

Engagement

With regard to FIG. 3, the system 110 is shown in an operational state in which the linkage 120 has moved relative to the container 118, such that the tip 122 of the wand unit 116 has been inserted into the container 118. In certain embodiments, this is accomplished by the controller 130 instructing the motor 124 to drive the linkage 120, thereby moving the wand unit 116 laterally (e.g. horizontally) toward the container 118 and/or elevationally (e.g. vertically) towards the container 118. In some embodiments, the tip 122 is positioned in substantially the radial center of the container 118. In certain variants, the tip 122 is offset from the radial center of the container 118, which can facilitate forming a vortex or rolling motion in the liquid during the frothing process. As shown, the longitudinal axis of the wand unit 116 can be parallel with vertical. In certain variants, the longitudinal axis of the wand unit is at an angle compared to vertical, such as being angled at least about: 1°, 3°, 5°, 10°, 15°, angles between the aforementioned angles, or other angles.

The system 110 can be configured such that the tip 122 of the wand unit 116 clears (e.g., does not impact or otherwise contact) the side and top of the container 118 as the wand unit 116 moves into the container 118. This can reduce or avoid damage to the wand unit 116 and/or spillage of the contents of the container 118. In certain variants, the elevator 128 moves the support assembly 126 to a lower or lowermost position before or during insertion of the wand unit 116 into the container 118. This can lower the position of the top of the container 118 relative to the tip 122 of the wand unit 116, which can facilitate introducing the tip 122 into the container 118.

Some embodiments are configured to detect, and/or to receive a user input regarding, the presence and/or type of the container 118 on the support assembly 126. This can allow the system 110 to adjust the position of the support assembly 126, so that the wand unit 116 can be safely moved into container 118. For example, in response to determining that a first container 118 with a first height is located on the support assembly 126, the elevator 128 can move the support assembly 126 to a first location, in which the wand unit 116 can be safely moved into the first container 118. And in response to determining that a second container 118 with a second height (greater than the first height) is located on the support assembly 126, the elevator 128 can move the support assembly 126 to a second location (lower than the first location), in which the wand unit 116 can be safely moved into the second container 118.

To facilitate the detection of the container 118, the support assembly 126 and/or the elevator 128 can include one or more sensors, such as proximity sensors, optical sensors, magnetic sensors, or other types of sensors. The sensors can be configured to detect the presence and/or aspects of the container 118 when the container 118 is on or near the support assembly 126. For example, in some embodiments, the container 118 includes one or more indicators (e.g., permanent magnets, serial barcode, matrix barcode, etc.), and the support assembly 126 and/or elevator 128 includes one or more sensors configured to detect the indicators. In some embodiments, the support assembly 126 includes an accelerometer to help monitor system level performance. For example, the system 110 can detect, with the accelerometer, when the support assembly 126 tilts more than a certain amount (e.g., more than the support assembly 126 tilts in a new state with a full pitcher on the support assembly 126). This can indicate that a bearing or other component on the support assembly 126 or elevator 128 may need replacement or maintenance. Certain implementations are configured such that, if the acceleration and/or speed of the support assembly 126 (e.g., when moving up or down with a substantially or completely full pitcher) is outside of a normal rage and/or is different from a previous movement, then the system can issue an alert that the system 110 may require preventative maintenance.

In some implementations, based on the detected indicators, or user inputs, the system 110 can access a database to identify characteristics of the container 118. For example, the type, size, strength, number, arrangement, and/or position of the indicators can be detected and cross-referenced (e.g., mapped with a lookup table) to corresponding information in the database. As an example, in some embodiments, in response to detecting that the container 118 has two magnetic indicators, the system 110 can access the database that cross-references two magnetic indicators to indicating a one-liter container. The database can include various information about the container 118, such as the volume, width, height, age, serial number, etc.

Some embodiments are configured to determine the height of the container 118. For example, some embodiments indirectly determine the height of the container 118, such as by receiving the height from a height field in the database. Certain embodiments detect the height of the container 118 directly. For example, the elevator 128, or another component of the system 110, can include a sensor (e.g., a sonic or optical transceiver) that can identify the approximate top of the container 118. The controller 130 can receive such information and determine an approximate height of the container 118.

Certain embodiments are configured to calculate, based at least in part on the height of the container 118, a position of the support assembly 126 at which the tip 122 of the wand unit 116 can be safely inserted into the container 118. In some embodiments, the controller 130 instructs the elevator 128 to move the support assembly 126 to such a position, or lower. In some embodiments, if the system 110 determines that a given container 118 is too tall (e.g., the support assembly 126 cannot be moved low enough to avoid the tip 122 of the wand unit 116 impacting the container 118), the system 110 does not initiate, or halts, attempting to move the wand unit 116 into the container 118. In certain variants, in response to determining that a given container 118 is too tall, the system 110 provides an alert, such as a warning light or a message on the user interface 132.

Heating and/or Frothing

Figure 4:
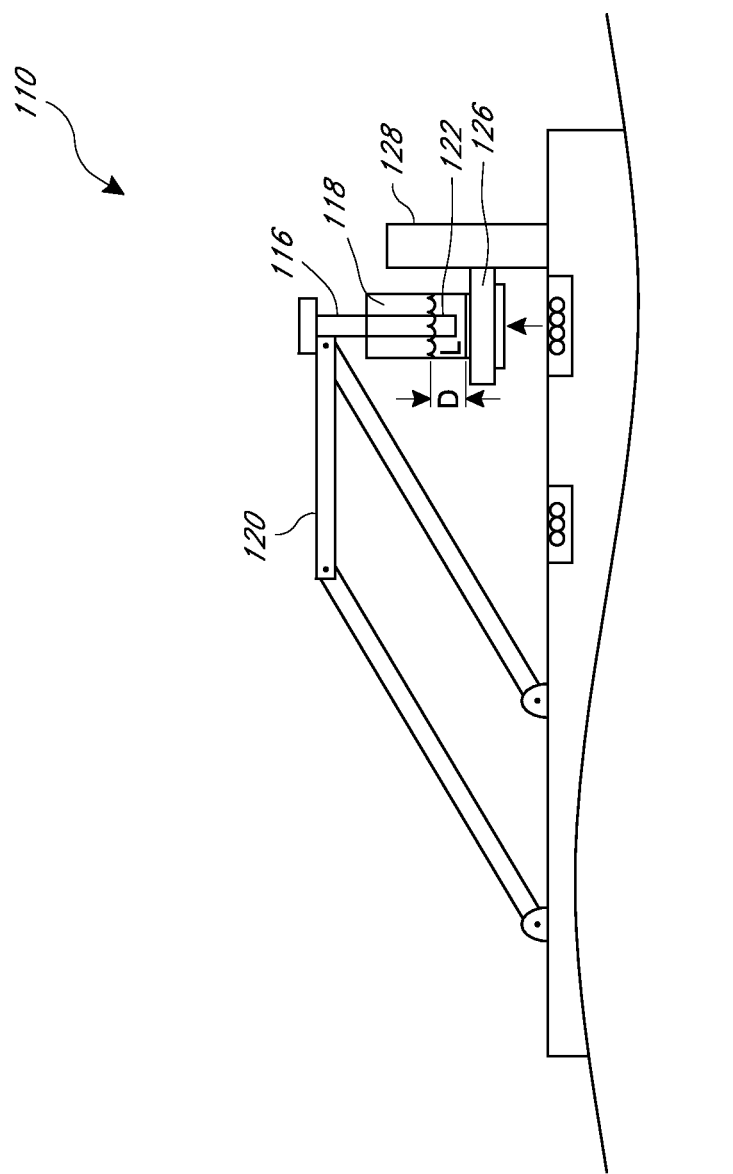

In some embodiments, when the wand unit 116 is initially inserted into the container 118, the tip 122 of the wand unit 116 is not submerged in the liquid, or is submerged in only an upper portion of the liquid (e.g., in the uppermost quarter of the height of the liquid). As shown in FIG. 4, in some implementations, after the wand unit 116 has been inserted into the container 118, the elevator 128 raises the support assembly 126. In some implementations, the support assembly 126 is raised concurrent with the wand unit 116 being inserted into the container 118. In certain variants, the linkage 120 moves the wand unit 116 downward within the container 118 and the support assembly 126 remains stationary or moves upward. In certain implementations, with the tip 122 in the unsubmerged position, fluid (e.g., steam) is discharged from the tip 122. This can aid in breaking any large bubbles on the surface of the liquid in the container 118. In some embodiments, the fluid discharged when the tip 122 is unsubmerged is at a lower velocity than the fluid discharged during the heating and/or frothing operations discussed below.

Raising the support assembly 126, and/or lowering the wand unit 116, can result in relative movement between the surface of the liquid in the container 118 and the tip 122 of the wand unit 116. This can result in submerging, or further submerging, of the tip 122 in the liquid. In some embodiments, the tip 122 is submerged to a heating position. In some embodiments, in the heating position, the tip 122 is submerged by at least about: 25% of the depth D of the liquid in the container 118, 50% of D, 75% of D, 90% of D, values between the aforementioned values, or other values. In certain variants, in the heating position, the tip 122 is positioned near or adjacent the bottom inside surface of the container 118. In certain embodiments, fluid (e.g., steam) can flow through the wand unit 116 and be discharged into the liquid L, thereby heating the liquid.

Figure 5:
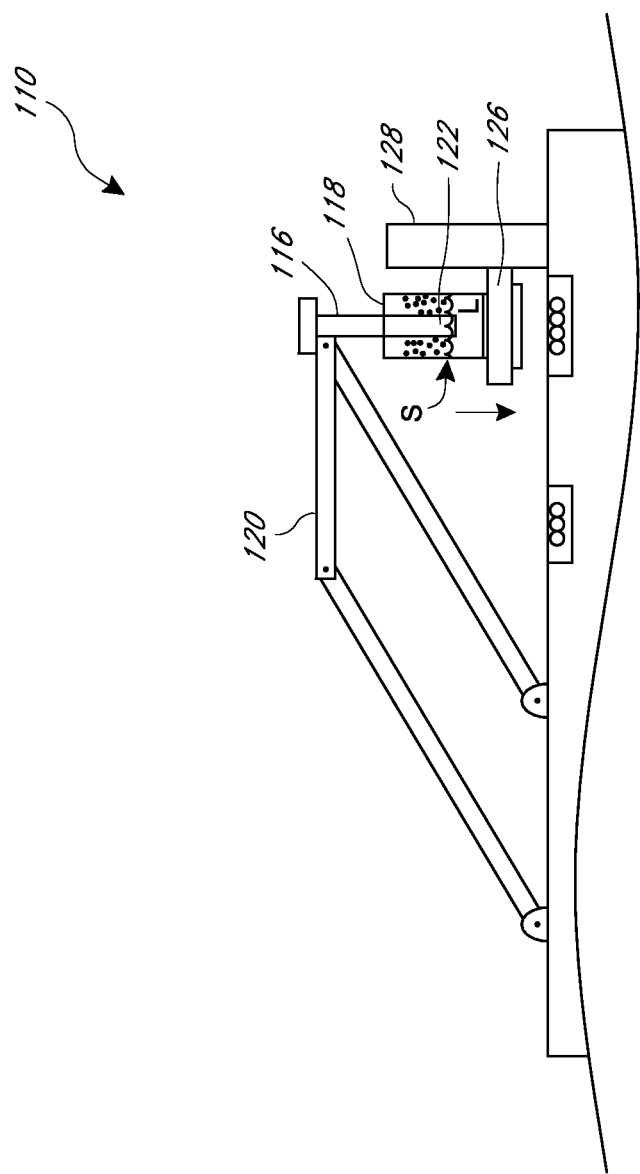

As illustrated in FIG. 5, the tip 122 can be brought to a frothing position, such as at or near the surface S of the liquid L. This can encourage incorporation of air into the liquid, such as by the flow of fluid (e.g., steam) from the wand unit 116 causing turbulence in the liquid, thereby producing froth. Certain embodiments are configured to adjust the wand unit 116 and the flow of fluid in order to affect the frothing operation and the produced froth. For example, the system 110 can be configured to adjust the position of the tip 122 (e.g., relative to the surface of the liquid), the length of time that the tip 122 is maintained in such a position, and/or the pressure of the fluid discharged from the tip 122. This can allow the system 110 to control the amount and character of froth produced, which can be desirable for different beverage types (e.g., a first froth amount and character of froth for a latte, a second amount and character of froth for a cappuccino, etc.). In some embodiments, in the frothing position, the tip 122 is submerged in the liquid by less than or equal to about: 25% of D, 15% of D, 10% of D, 5% of D, 1% of D, values between the aforementioned values, or other values. In various embodiments, to position the tip 122 in the frothing position, the distance between the tip 122 and the surfaces of the liquid L is reduced, compared to the distance in the heating position. For example, the tip 122 can be moved upward by the linkage 120 and/or the support assembly 126 can be moved downward by the elevator 128. In some embodiments, the linkage 120 includes a mechanism configured to move the wand unit 116 vertically without also moving the steam wand horizontally, such as a telescoping element.

In certain embodiments, the system 110 is configured to maintain the wand unit 116 at or near the frothing position (e.g., at or near the surface of the liquid L). For example, some embodiments are configured to move the wand unit 116 and/or the support assembly 126 during the heating and/or frothing operation. During the course of frothing, some liquid may be converted to froth, so the depth D of the liquid may decrease. Thus, some embodiments are configured to move the tip 122 downward and/or the container 118 upward to offset such depth change. In certain implementations, due to an increase in overall volume (of the liquid and the froth), some embodiments are configured to move the tip 122 upward and/or the container 118 downward during the frothing operation.

To aid in positioning the tip 122 relative to the surface of the liquid, certain embodiments are configured to determine the position (e.g., height) of the surface of the liquid in the container 118. In some embodiments, the position of the surface of the liquid is known and generally constant. For example, in some implementations, the container 118 has a recommended fill level, which is the amount up to which the container 118 is to be filled with liquid. The height of the liquid at the fill level can be determined (e.g., empirically) and included in the database. Thus, when the system 110 accesses the database (as discussed above), the system 110 can retrieve the height of the surface of the liquid for the container 118 and can adjust the position of the wand unit 116 and/or the support assembly 126 accordingly, such as to place and/or maintain the tip 122 in the frothing position.

In some embodiments, the position of the surface of the liquid is unknown and/or variable. For example, certain containers may not have a recommended fill level and/or may not have liquid surface height information in the database. In some embodiments, the system 110 is configured to detect the surface of the liquid, such as with one or more sensors. For example, the wand unit 116 can include one or more temperature sensors that can detect a rapid and/or substantial change in temperature, such as may occur when the wand unit 116 penetrates from ambient air into the liquid. In certain implementations, the system 110 is configured to discern that the surface of the liquid is at or near a location (e.g., less than or equal to about 10 mm away) in which the temperature sensor detects a temperature of less than or equal to about 6° C. and/or a temperature change of at least about 10° C. over a period of less than or equal to about 1 second. In some embodiments, the wand unit 116 includes liquid sensors at periodic locations along its length. The location of the surface of the liquid can be estimated as being between a sensor that detects the presence of liquid and an adjacent sensor that does not detect the presence of liquid. In some embodiments, the system 110 includes sensors (e.g., sonic or optical transceivers) configured to determine a position of the surface S, and thus, the height above the support assembly 126. Certain variants can measure the weight of the container 118 and use such a weight in calculating an approximate height of the surface S.

The system 110 can reduce or stop the discharge of fluid (e.g. steam) from the wand unit 116 in response to a condition being met. In some variants, the condition comprises a temperature set point of the liquid being achieved (e.g., at least about 55° C.), a temperature maximum being achieved (e.g., at least about 63° C.), a certain amount of time elapsing (e.g., at least about 30 seconds), or otherwise. Certain embodiments include one or more sensors to detect aspects related to the produced froth. For example, some embodiments can detect aspects of the froth from a change in electrical properties (e.g., capacitance), optical properties, acoustic properties, level detection, etc. In some variants, the condition comprises a froth setpoint value, such as a volume of froth reaching a certain value.

Some implementations are configured to vary the amount and/or pressure of the fluid discharged from the wand unit 116. For example, some embodiments include a proportional valve that adjusts the fluid flow. Adjusting the fluid flow can provide different rates of heating and/or amounts of turbulence in the liquid, which can facilitate creating different amounts and/or types of froth. In some embodiments, the system 110 is configured to reduce the amount and/or pressure of the discharged fluid based on a location of the tip 122. For example, when the tip 122 is at or near the surface of the liquid (e.g., during an aerating operation, such as is shown in FIG. 5), the flow rate and/or pressure of the fluid can be reduced compared to when the tip 122 is not at or near the surface of the liquid (e.g., during a heating operation, such as is shown in FIG. 4). This can inhibit or prevent splattering during the aerating operation and/or can accelerate heating during a heating operation.

Disengagement

Figure 6:
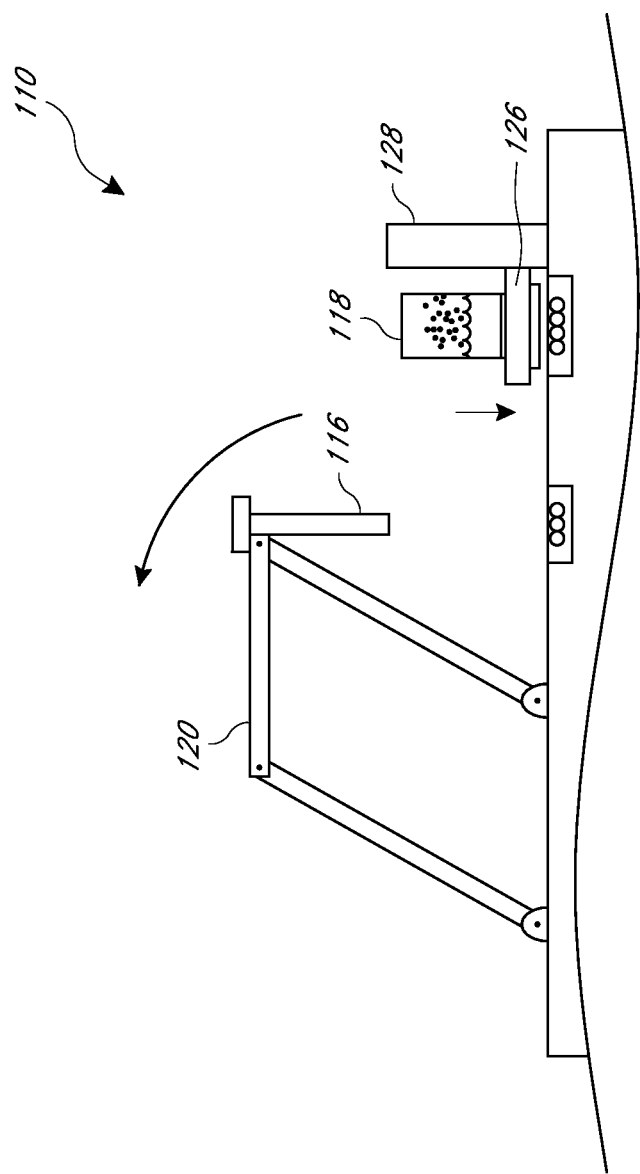

As indicated in FIG. 6, the system 110 can withdraw the wand unit 116 from the container 118. This can facilitate ready access to the container 118 of heated frothed liquid. In some embodiments, withdrawal of the wand unit 116 occurs in response to an input from a user, such as a command issued through the user interface 132. In certain embodiments, the withdrawal of the wand unit 116 occurs automatically, such as in response to one or more of the above-mentioned, or other, conditions being met. As illustrated, in some embodiments, the elevator 128 moves the support assembly 126 downward, and/or the linkage 120 moves the wand unit 116 upwardly and laterally away from the container 118. In various embodiments, the system 110 is configured to remove the wand unit 116 from the container 118 without the tip 122 contacting container 118.

Figure 7:
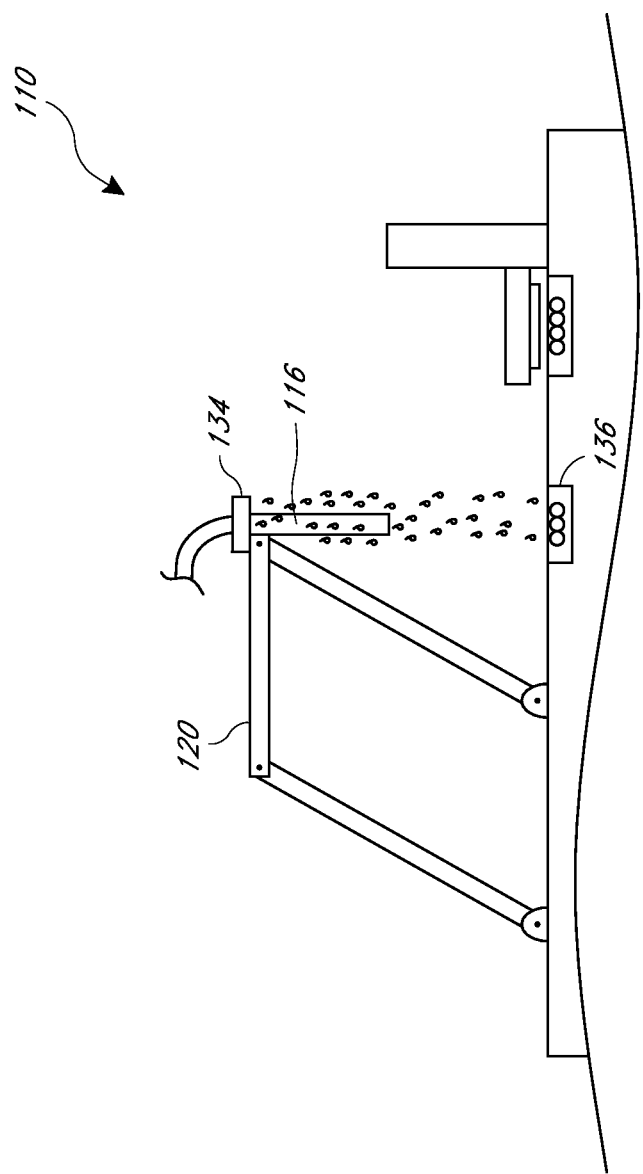

As can be seen in FIG. 7, in some embodiments, the container 118 can be removed from the support assembly 126. For example, a user can lift the container 118 off the support assembly 126. Removal of the container 118 from the support assembly 126 can facilitate using the heated frothed contents of the container 118 in preparing a beverage. For example, the container 118 can be moved to a mixing area (e.g., an area where espresso and the contents of the container 118 are combined) and/or the contents of the container 118 can be poured out of the container 118. In some embodiments, the system 110 can notify a user that the container is ready to be removed from the support assembly 126. For example, the system 110 can includes an audible alert (e.g., tone), visual alert (e.g., flashing light), etc.

Cleaning

In certain embodiments, the system 110 is configured to cleanse the wand unit 116. For example, the system 110 can include a wand cleaning unit, such as a collar 134. In some embodiments, the collar 134 can receive cleaning fluid (e.g., potable water) and can deliver (e.g., spray) the cleaning fluid onto an outer surface to the wand unit 116. In some embodiments, the system 110 includes a control valve, such as a solenoid valve, that can open and close to permit or inhibit a flow of the cleaning fluid to the collar 134. Operation of the control valve can be controlled by the controller 130. In various embodiments, the collar 134 is positioned at an upper or uppermost portion of the wand unit 116. Thus, as illustrated in FIG. 7, by force of gravity, the cleaning fluid can flow down some, a majority, or substantially all of the elongate length of the wand unit 116. This can wash the wand unit 116 of residual foamed liquid or other material on the outer surface of the wand unit 116. In some implementations, the outer surface of the wand unit 116 includes features to promote the flow of cleaning fluid (e.g. spiral or longitudinal channels, a surface treatment, etc.). As shown, the system 110 can include a wand drain 136, which can be positioned under the wand unit 116 in the disengaged (e.g., retracted) position. Thus, the wand drain 136 can receive the cleaning fluid that has flowed down the wand unit 116.

In some embodiments, the system 110 is configured to automatically purge the wand unit 116. For example, the system 110 can discharge a burst of fluid from the tip 122. This can aid in removing froth or residue from the channel in the wand unit 116. In some embodiments, the purge operation occurs concurrent with, or before, the cleaning operation of the outer surface of the wand unit 116. In certain variants, the purge operation occurs as the wand unit 116 is moving between the positions shown in FIGS. 5 and 6, and/or substantially immediately after the wand unit 116 has been removed from the container 118.

Figure 8:
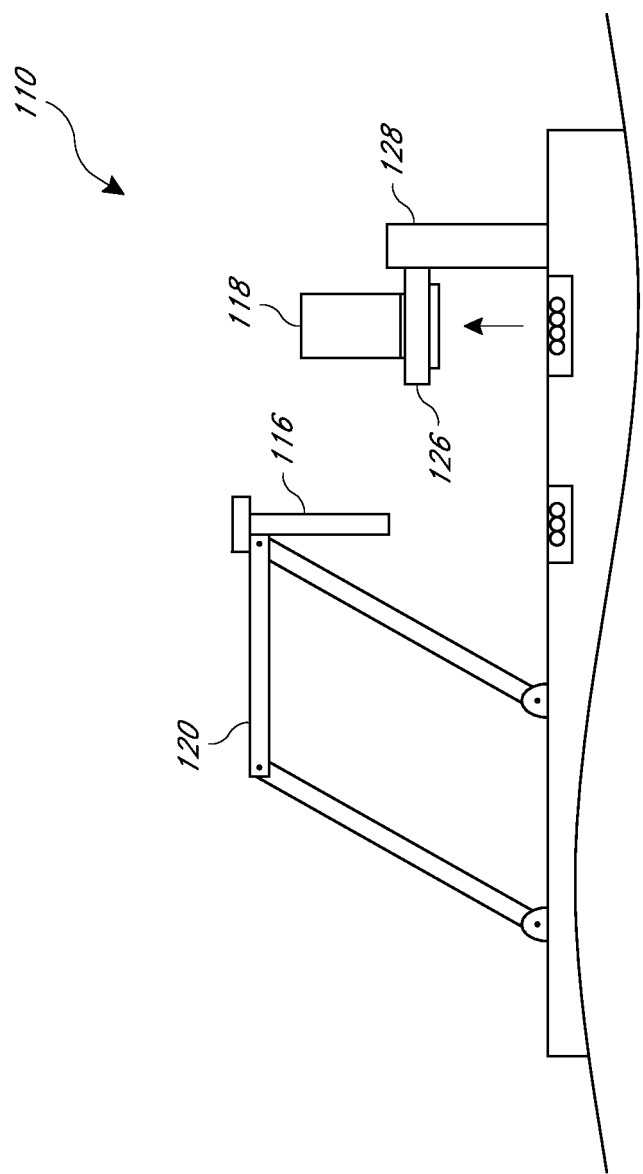

In certain embodiments, the system 110 is configured to cleanse the inside of the container 118. As shown in FIG. 8, the elevator 128 can raise the support assembly 126 to an upper or uppermost position. This can facilitate further positioning of the container 118 and/or can position the support assembly 126 in a convenient location to receive the container 118 again (e.g., by a user putting the container 118 back on the support assembly 126). In some embodiments, the support assembly 126 is located at a lower position (e.g., as shown in FIG. 7), and is raised (e.g., as shown in FIG. 8) after the container 118 has been placed on the support assembly 126. In some embodiments, the support assembly 126 is raised to a position in which the distance between the top of the support assembly 126 and the counter is greater than the height of the container 118. As previously mentioned, the support assembly 126 and container 118 can be coupled to one another, such as with permanent magnets. The coupling can allow the container 118 to be secured to the support assembly 126, while still permitting the container 118 to be readily removed.

Figure 9:
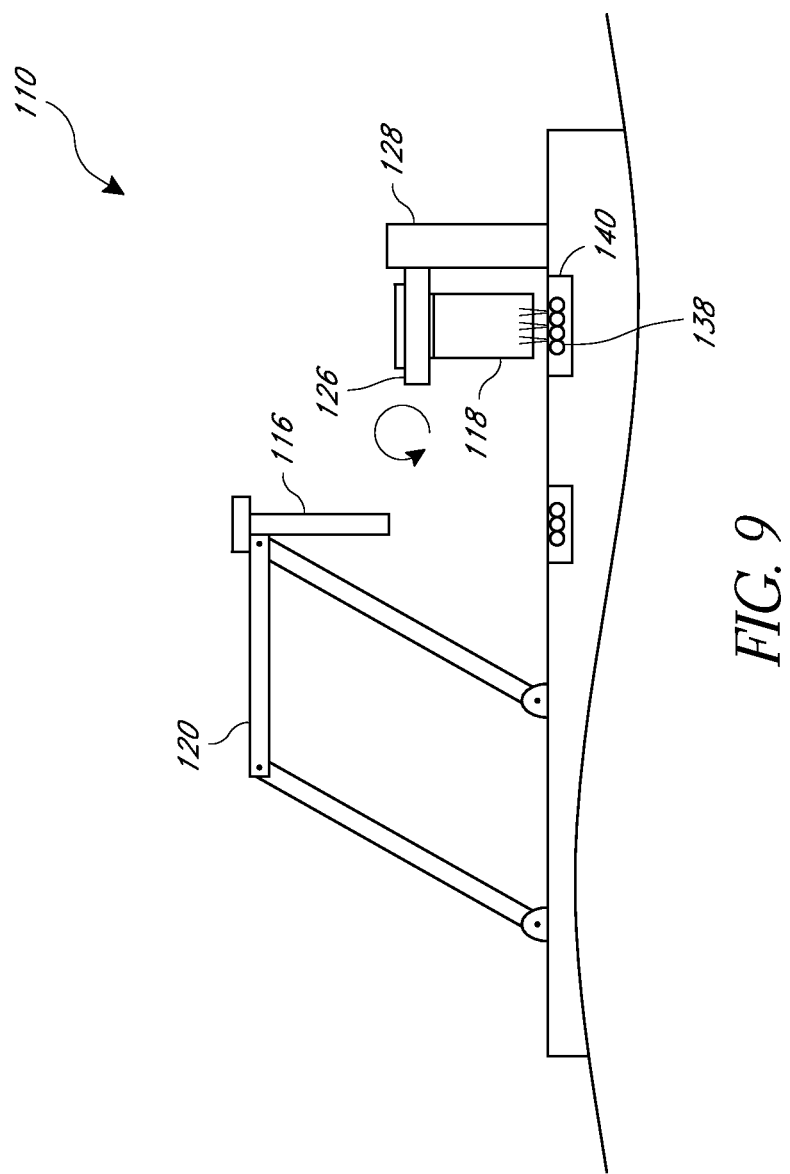

As indicated in regard to FIG. 9, in some embodiments, the support assembly 126 is configured to rotate, such as about an axis that is generally parallel to horizontal. This can result in the container 118 on the support assembly 126 being moved to a rotated position. In some embodiments, in the rotated position, the container 118 is flipped, such as about 180° and/or inverted (e.g., upside-down). In some embodiments, from an upright position (e.g., a generally vertical position as illustrated in FIG. 8) to the rotated position, the container 118 is rotated at least about: 90°, 100°, 120°, 150°, 180°, 210°, amounts between the aforementioned amounts, or other amounts. In various embodiments, the strength of the coupling between the container 118 and support assembly 126 is sufficient to maintain the container 118 on the support assembly 126, even in the rotated position, as is illustrated. In the rotated position, residual liquid and froth in the container 118 can flow out of the container 118 by force of gravity. As shown, some implementations include a container drain 140 or catch basin to receive such residual liquid and froth.

As also illustrated in FIG. 9, certain embodiments include a container cleaning unit, such as one or more nozzles 138. The nozzles 138 can be configured to spray cleaning fluid (e.g., potable water) into the inverted container 118. For example, the nozzles 138 can spray generally upwardly into the inverted container 118 to wash the inside of the container 118. The cleaning fluid can fall into, and be received by, the container drain 140 or catch basin. In some implementations, operation of the nozzles 138 is governed by the controller 130. For example, the controller can control operation of a solenoid or other type of valve that opens to deliver the cleaning fluid to the nozzles 138.

Figure 10:
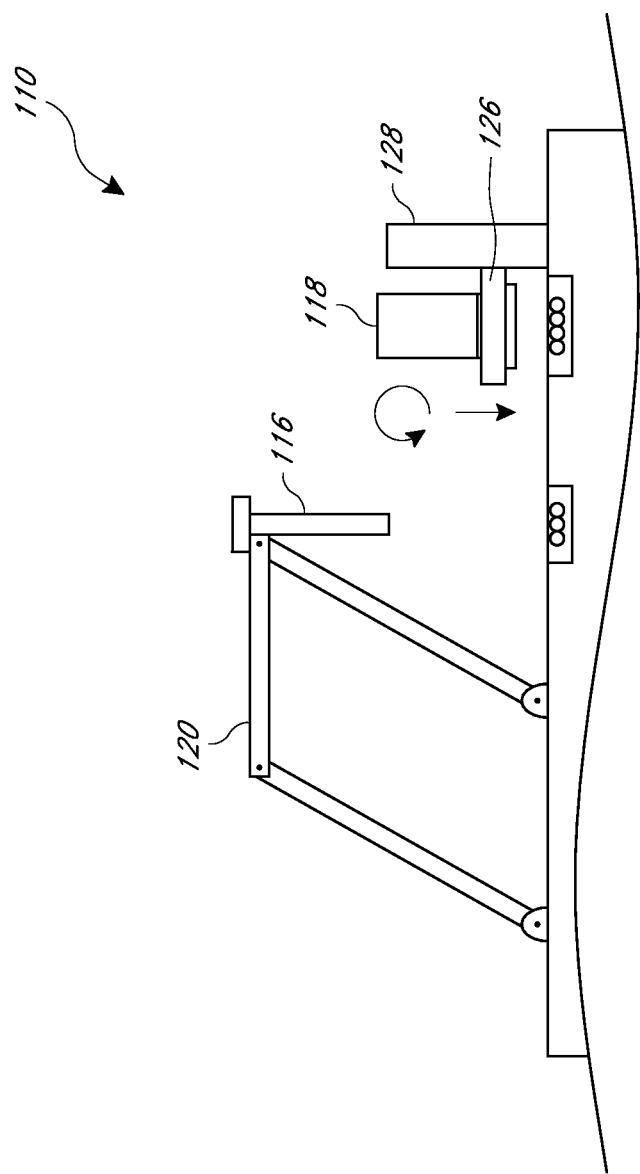

As illustrated in FIG. 10, in some embodiments, after the container 118 has been washed, the support assembly 126 can rotate again. For example, the container 118 can be returned to an upright orientation. In some embodiments, the elevator 128 can move to a lower or lowermost position during or after the rotation of the support assembly 126. In general, the system 110 can return to a preparatory state, such as is illustrated in FIGS. 2A and 2B, in which the system 110 is ready to prepare another heated frothed beverage. For example, another amount of liquid can be added to container 118 (e.g., by removing the container 118 from the support assembly 126, adding the liquid into the container 118, and replacing the container 118 on the support assembly 126) and some or all of the operational steps described above can be repeated.

Figure 11:
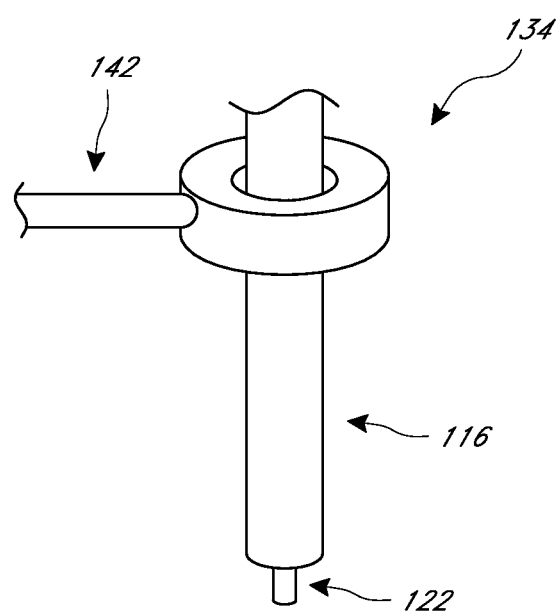
FIG. 11 illustrates a perspective view of an embodiment of a wand cleansing unit.
Figure 12B:
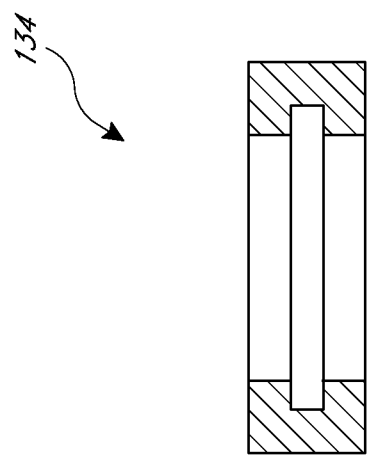
FIGS. 12A and 12B illustrate side cross-sectional views of an annular collar of the wand cleansing unit of FIG. 11.

Collar (FIGS. 11-12B)

FIG. 11 illustrates a perspective view of an embodiment of the collar 134. As shown, the collar 134 can comprise an annular or semi-annular member. The collar 134 can surround a circumference of the wand unit 116. In certain embodiments, the collar 134 does not contact the wand unit 116.

As mentioned above, the collar 134 can be configured to deliver cleaning fluid to the outer surface of the wand unit 116. For example, the collar 134 can receive a flow of potable water or another cleaning fluid from a fluid source via a tube 142. The collar 134 can dispense the cleaning fluid radially inwardly onto the outer surface of the wand unit 116. As illustrated, the collar 134 can be positioned at the top or top portion of the wand unit 116. Thus, the cleaning fluid discharged from the collar 134 can flow down some or all of the longitudinal length of the wand unit 116, thereby washing away excess or residual froth or other material on the wand unit 116. In various implementations, the collar 134 is configured to spray cleaning fluid on an end of the wand unit 116 that is opposite the tip 122. In certain embodiments, the system 110 is adapted to clean the wand unit 116 without needing to submerge the tip 122 in a reservoir of cleaning fluid and/or without spraying clean fluid directly on an end of the wand unit 116 that includes the tip 122.

Figure 12A:
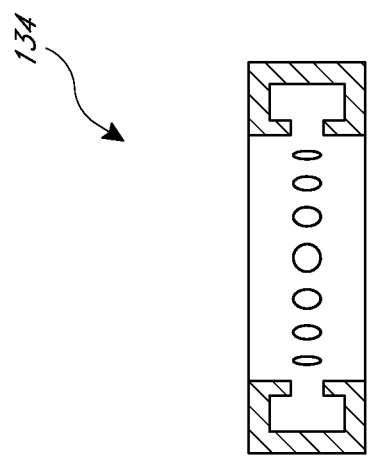

The collar 134 can include a radially inner surface that is configured to discharge the cleaning fluid. In some embodiments, the radially inner surface has one or more dispensing elements, such as notches or holes, as illustrated in FIG. 12A. The dispensing elements can be equally or non-equally distributed around the circumference of the radially inner surface. In some variants, the dispensing element comprises a generally or completely continuous annular gap, such as is illustrated in FIG. 12B. In various embodiments, the collar 134 can provide an annular spray of cleaning fluid around substantially the entire circumference of the upper end of the wand unit 116.

As described above, in some embodiments, the system 110 can be configured to control the cleaning operation. For example, the controller 130 can govern operation of the control valve, such as by sending one or more signals instructing the control valve to open or close in order to, respectively, start or stop the flow of cleaning fluid to the collar 134. In some embodiments, the cleaning operation is initiated by a user input, such as a switch or button on the user interface 132. In some variants, the cleaning operation is automatically initiated in response to positioning the wand unit 116 in a certain position, such as generally vertically over the wand drain 136. In some embodiments, a preset volume of cleaning fluid is dispensed to the wand unit 116, such as at least about: 25 ml, 50 ml, 100 ml, 150 ml, 200 ml, volumes between the aforementioned volumes, or other volumes. Some implementations are configured to dispense cleaning fluid for a certain period, such as at least about: 0.25 seconds, 0.50 seconds, 0.75 seconds, 1.0 seconds, 1.5 seconds, 2.0 seconds, periods between the aforementioned periods, or other periods. In some embodiments, the collar 134 is configured to provide a generally laminar flow of cleaning fluid along some, substantially all, or all of the length of the wand unit 116.

In some variants, the collar 134 is configured to provide a substantially or completely continuous layer of cleaning fluid to the wand unit 116 during a portion of the cleaning operation. The layer can be provided around substantially all, or all, of the circumference of the wand unit 116 and/or along substantially all, or all, of the length of the wand unit 116. For example, some embodiments are configured to provide a water jacket around and along the wand unit 116 during the course of the cleaning operation. As described above, the cleaning fluid can flow down the surface of the wand unit 116 and flow off a lower end (e.g., the tip) of the wand unit 116. This can wash-away material (e.g., residual froth) on the wand unit 116. The cleaning fluid and washed-away material can be received and/or collected in the wand drain 136.

Figure 13:
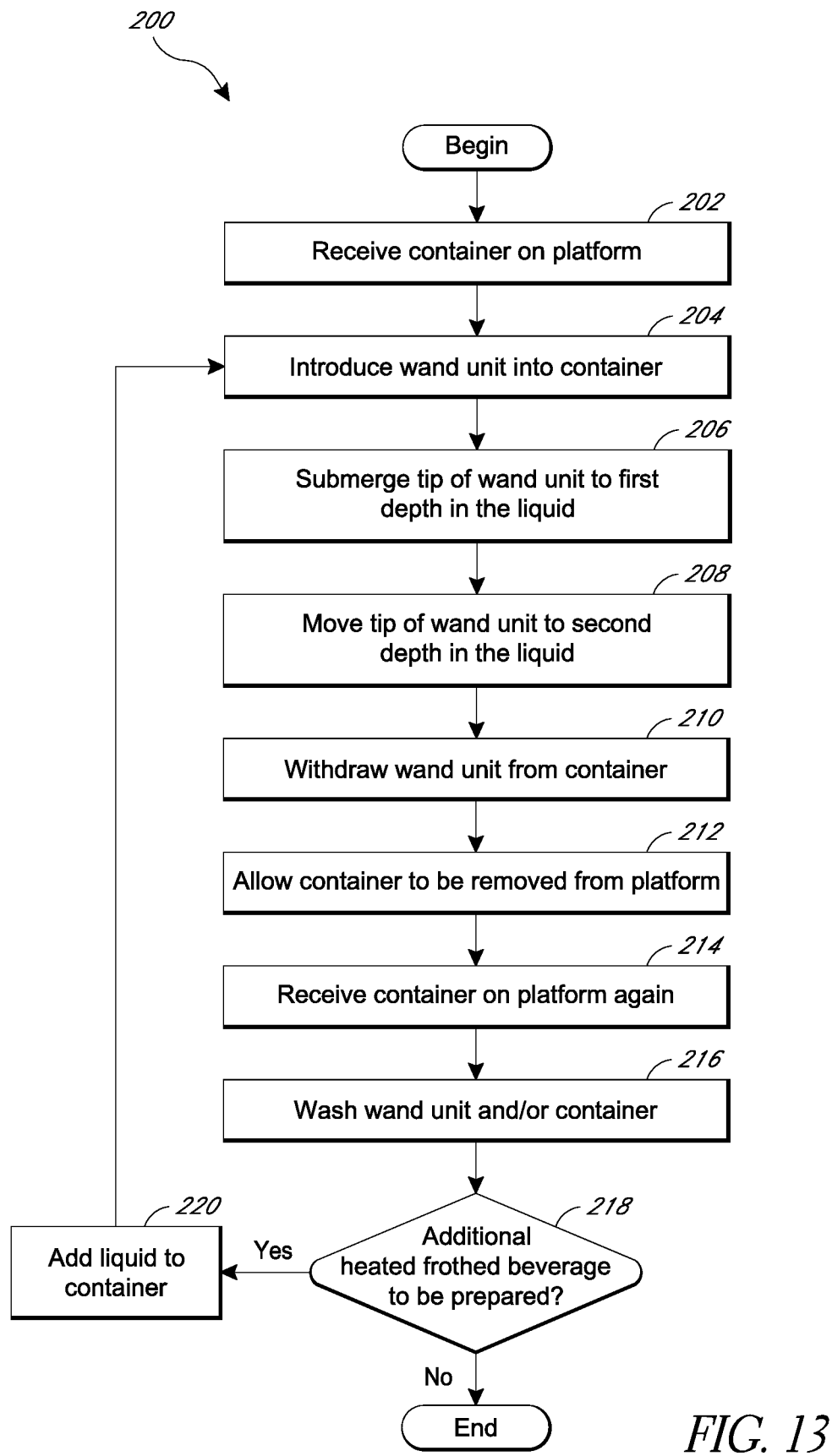
FIG. 13 illustrates an embodiment of a method of preparing a heated and/or frothed beverage.
Figure 14:
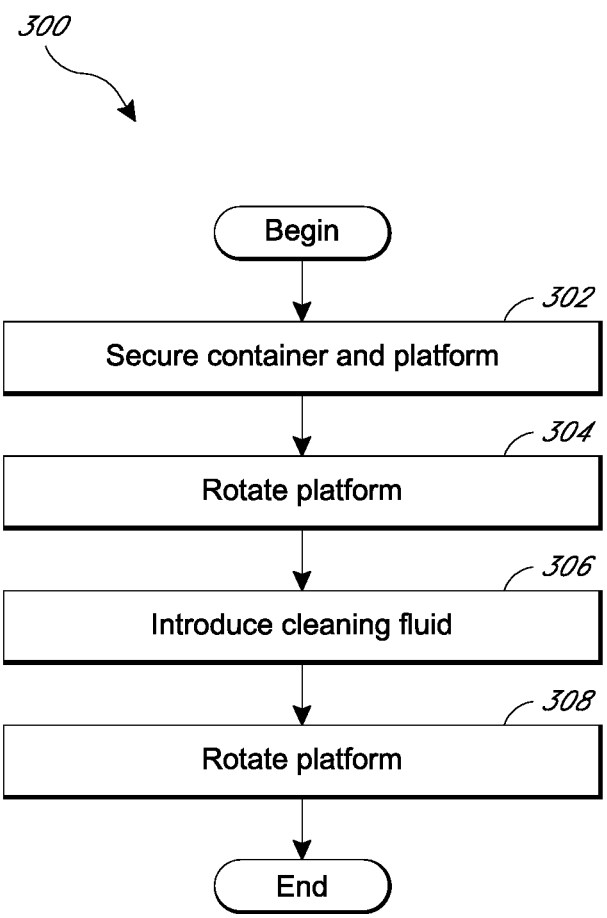
FIG. 14 illustrates an embodiment of a method of cleaning a container.

Certain Methods (FIGS. 13 and 14)

FIG. 13 illustrates an example method 200 of preparing a heated and/or frothed beverage using a beverage preparation system, such as the system 110. As shown, the method can include receiving a container on a support assembly, such as a platform, of the system 202. Some embodiments include securing the container with the support assembly, such as by a magnetic or mechanical coupling. The container can contain a liquid to be heated and/or frothed, such as milk. Certain embodiments include introducing liquid into the container while the container is on the support assembly, such as by passing the liquid through an open upper end of the container and/or by passing the liquid through a passage in the bottom of the container.

The method can include moving a wand unit into the container 204. For example, the wand unit can be moved with a mechanical linkage, such as a four-bar linkage. Some implementations include moving the wand unit in a smooth manner, such a without jerking or abrupt changes in direction. In some embodiments, when the wand unit is moved into the container, a tip of the wand unit is not initially submerged in the liquid in the container.

As illustrated, the method can include submerging the tip in the liquid to a first depth 206 (e.g., a heating depth). For example, the support assembly can be moved upwardly, such as with an elevator. In some variants, the wand unit is moved downwardly, such as by movement of the linkage. In some implementations, the first depth (measured down from the surface of the liquid) is at least about: 20 mm, 25 mm, 30 mm, 40 mm, 50 mm, 60 mm, 75 mm, values between the aforementioned values, or other values. In some implementations, the first depth is at least 50% of the depth of the liquid and/or the tip is positioned approximately at the bottom of the container. In some embodiments, at the first depth, fluid (e.g., heated air or steam) is discharged from the wand unit and into the liquid to heat the liquid.

The method can include moving the tip to a second depth 208 (e.g., a frothing depth) in the liquid. The second depth can be less than the first depth, such as less than one-half of the first depth. In various embodiments, the second depth is at or just below the surface of the liquid. For example, the second depth (measured down from the surface of the liquid) can be less than or equal to about: 20 mm, 15 mm, 10 mm, 5 mm, 3 mm, 1 mm, values between the aforementioned values, or other values. In some embodiments, the method includes moving the tip of the wand unit above the surface of the liquid, such as less than or equal to about 10 mm above the surface of the liquid. In some embodiments, at the second depth, fluid (e.g., air or steam) is discharged from the wand unit and into the liquid to froth the liquid.

In various embodiments, the submerging the tip in the liquid to the first depth 206 and/or moving the tip to the second depth 208 can include moving the support assembly, wand unit, or both. For example, in some embodiments, such actions are performed by the support assembly moving the container (e.g., generally vertically), while the wand unit is substantially stationary. In certain variants, such actions are performed by the linkage moving the wand unit, while the container on the support assembly is substantially stationary. In some implementations, such actions are performed by the support assembly moving the container and the linkage moving the wand unit, either in parallel or in series. Some embodiments include moving the tip to the first and/or second depth multiple times (e.g., from the first depth to the second depth and back to the first depth, or vice versa). Certain embodiments include moving the tip to one or more additional depths, such as to a third depth. The third depth can be between the first and second depths, can be a depth that is greater than (more submerged) the first depth, or can be a depth that is less than (less submerged) the second depth.

As illustrated, the method can include withdrawing the wand unit from the container 210. For example, the linkage can reverse its movement, compared to the insertion action 204. Withdrawal of the wand unit can facilitate removal of the container from the support assembly 212. For example, the container can be removed from the support assembly by a user and brought to a mixing area, in which the heated and/or frothed beverage can be removed from the container and used in making a beverage, such as a latte or cappuccino. In some variants, the system is configured to remove the heated and/or frothed beverage from the container while the container is on the support assembly, such as via a suction tube. Some embodiments include receiving the container on the support assembly again 214. For example, the user can put the container back on the support assembly. Some embodiments include a wash operation 216, such as an operation to wash the wand unit and/or the container, as is discussed in more detail below. In some implementations, washing the wand unit occurs substantially immediately following withdrawal of the wand unit from the container 210. This can reduce or eliminate adhesion of froth with the outer surface of the wand unit 116. In some embodiments, washing the wand unit occurs before and/or concurrent with removal of the container from the support assembly 212.

As illustrated, the method 200 can include a decision block 218, which can ask whether there are additional heated and/or frothed beverages to be prepared. If the answer is yes, then the method 200 can include adding liquid (e.g., milk) to the container 220. In some embodiments, the container can have liquid added into it before being placed back on the support assembly (as described above in block 214). Some embodiments include removing the container from the support assembly and adding liquid. In some variants, the system is configured to add liquid to the container while on the support assembly, such as with a tube connected with a source of the liquid (e.g., a milk dispenser). In some embodiments, the support assembly includes a nozzle and/or valve that engages a bottom of the container, such that liquid can be added to the container through the bottom of the container. As shown, the method can return to block 204 to introduce the wand unit into the container and the method 200 can continue. In some embodiments, if the answer to the decision block 218 is no, then the method 200 ends.

In another embodiment of the method 200, the method includes heating and/or frothing the liquid without moving the tip of the wand unit relative to the surface of the liquid. This can enable faster beverage preparation and/or less motion of the container. In some embodiments, the wand unit can include a lower port for discharging fluid for heating the liquid and an upper port for fluid for aerating the liquid. For example, the lower port can be at or near the tip 122 and the upper port can be spaced apart from the tip 122 by at least about 20 mm. The method can include introducing the wand unit into the liquid such that the upper port is at or near the surface of the water and the lower port is submerged in the liquid to a greater extent than the upper port. The method can include discharging fluid from the lower port to heat the liquid and/or discharging fluid from the upper port to aerate the liquid to produce froth. Because of the positioning of the upper and lower ports, movement of the tip 122 relative to the surface of the liquid may be unneeded, thus enabling the beverage to be prepared more rapidly and/or with less motion of the container.

FIG. 14 illustrates an example method 300 of a washing operation, such as an operation for washing the container. In some embodiments, the method includes securing the container to the support assembly 302, such as by mechanically or magnetically coupling the container and the support assembly.

Certain embodiments include rotating the support assembly 304. This can be performed while the container and the support assembly are coupled, such that the bottom of the container remains attached to the support assembly. In some embodiments, the support assembly rotates about an axis that is substantially horizontal. In some embodiments, the method includes rotating the support assembly, and/or the container attached to the support assembly, at least about: 120°, 140°, 160°, 180°, 200°, values between the aforementioned values, or otherwise. In various embodiments, the support assembly is positioned such that rotation of the support assembly does not result in the container contacting a counter, drain, or other structure below the support assembly.

In some embodiments, the method includes rotating the support assembly to place the container in a cleaning position, such as an approximately inverted position. In some embodiments, the container is not perfectly inverted. For example, the container can be offset from perfectly inverted by at least about: 1°, 3°, 5°, 10°, values between the aforementioned values, or otherwise.

As shown, the method can include introducing cleaning fluid into the container 306. For example, cleaning fluid can be sprayed upwardly into the inverted container or through a port in the bottom of the container. In some embodiments, the method includes allowing the cleaning fluid and residual material (e.g., residual liquid and froth) to exit downward out of the container by gravity. Some variants include receiving the cleaning fluid, such as in a drain or catch basin.

In some embodiments, the method includes rotating the container 308, such as to an upright position. For example, the container can be rotated approximately 180°. In some embodiments, the container is rotated in opposite rotational directions when rotating from the upright position to the inverted position, and from the inverted position to the upright position. In some variants, the container is rotated in the same rotational direction when rotated from the upright position to the inverted position, and from the inverted position to the upright position. In the upright position, the container can be ready for further use, such as to receive additional liquid and to be used in the preparation of additional heated and/or frothed beverage.

Certain Terminology

As used herein, the term "beverage" has its ordinary and customary meaning, and includes, among other things, any edible liquid or substantially liquid substance or product having a flowing quality (e.g., juices, coffee beverages, teas, milk, beer, wine, cocktails, liqueurs, spirits, cider, soft drinks, flavored water, energy drinks, soups, broths, combinations of the same, or the like).

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. The term "generally" as used herein represents a value, amount, or characteristic that predominantly includes, or tends toward, a particular value, amount, or characteristic. As an example, in certain embodiments, as the context may dictate, the term "generally parallel" can refer to something that departs from exactly parallel by less than or equal to 20 degrees and/or the term "generally perpendicular" can refer to something that departs from exactly perpendicular by less than or equal to 20 degrees.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

SUMMARY

Although this disclosure describes certain embodiments and examples of beverage dispensing systems and methods, many aspects of the above-described systems and methods may be combined differently and/or modified to form still further embodiments or acceptable examples. All such modifications and variations are intended to be included herein within the scope of this disclosure. For example, although a single wand unit is illustrated, some embodiments have multiple wand units, such as two, three, four, or more. As another example, while certain embodiments discussed above include the liquid being added to the container before being placed on the support assembly, some variants are configured to introduce liquid into the container after the container has been placed on the support assembly, such as with a nozzle in communication with a source of liquid milk, and with a control valve (e.g., a solenoid valve) configured to open in response to a command from the controller to allow the liquid milk to flow into the container on the support assembly. As another example, although certain embodiments are described with a cleaning unit that moves with the wand unit, in some embodiments the wand unit moves relative to the cleaning unit (e.g., the wand unit passes into a small bath, through a spraying nozzle, etc.). As a further example, although certain embodiments are described with a wand unit that moves horizontally and vertically (e.g., in an arc) to engage the container on the support assembly, in some embodiments the support assembly and container move horizontally and vertically (e.g., in an arc) to engage the wand unit. For example, the support assembly can be connected with the linkage and the wand unit can be connected with the elevator. A wide variety of designs and approaches are possible and are within the scope of this disclosure. While illustrative embodiments have been described herein, the scope of all embodiments having equivalent elements, modifications, omissions, combinations (e.g., of aspects across various embodiments), adaptations and/or alterations as would be appreciated by those in the art based on the present disclosure. Additionally, note that this application incorporates by reference the entirety of the U.S. provisional patent application No. 62/220,680, filed Sep. 18, 2015, titled "BEVERAGE DISPENSING SYSTEMS AND METHODS," and the entirety of U.S. provisional patent application No. 62/327,808, filed Apr. 26, 2016, titled "BEVERAGE DISPENSING SYSTEMS AND METHODS."

Also, although there may be some embodiments within the scope of this disclosure that are not expressly recited above or elsewhere herein, this disclosure contemplates and includes all embodiments within the scope of what this disclosure shows and describes. Further, this disclosure contemplates and includes embodiments comprising any combination of any structure, material, step, or other feature disclosed anywhere herein with any other structure, material, step, or other feature disclosed anywhere herein. For example, like the wand manipulation assembly and/or the container manipulation assembly of the system 10, in some embodiments, the wand manipulation assembly and/or the container manipulation assembly of the system 110 can be distinct from, and not a part of, a beverage machine (e.g., spaced apart from an espresso machine).

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Some embodiments have been described in connection with the accompanying drawings. The figures are drawn to scale, but such scale should not be interpreted to be limiting. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Also, any methods described herein may be practiced using any device suitable for performing the recited steps.

Moreover, while components and operations may be depicted in the drawings or described in the specification in a particular arrangement or order, such components and operations need not be arranged and performed in the particular arrangement and order shown, nor in sequential order, nor include all of the components and operations, to achieve desirable results. Other components and operations that are not depicted or described can be incorporated in the embodiments and examples. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations, and it should be understood that the described components and systems can generally be integrated together in a single product or packaged into multiple products.

In summary, various illustrative embodiments and examples of beverage dispensing systems and methods have been disclosed. Although the systems and methods have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Accordingly, the scope of this disclosure should not be limited by the particular disclosed embodiments described above, but should be determined only by a fair reading of the claims that follow as well as their full scope of equivalents.

The following is claimed:

1. A method of automatically preparing a heated frothed beverage with a beverage preparation system, the method comprising:
receiving a container into engagement with a support assembly of the beverage preparation system, the container configured to hold a liquid to be heated and frothed;
controlling, with corresponding mating features on the container and the support assembly, the rotational orientation of the container about a longitudinal axis of the container, wherein the corresponding mating features comprise attractive magnetic elements;
securing the container to the support assembly;
inserting a wand unit of the beverage preparation system into the container;
automatically moving, with a motor, the support assembly relative to the wand unit or the wand unit relative to the support assembly such that the tip of the wand unit is submerged in the liquid to a frothing depth, the frothing depth being such that the tip of the wand unit is positioned at approximately the surface of the liquid;
discharging steam from the tip of the wand unit at the frothing depth, thereby frothing the liquid;
permitting dispensing of the frothed liquid from the container;
rotating, with the beverage preparation system, the support assembly and container at least 90° to an inverted position; and
after dispensing the frothed liquid from the container, washing the container in the inverted position and with the container secured to the support assembly.

2. The method of claim 1, further comprising:
submerging a tip of the wand unit in the liquid to a heating depth, the heating depth being greater than the frothing depth; and
discharging steam from the tip of the wand unit at the heating depth, thereby heating the liquid.

3. The method of claim 1, further comprising automatically removing the wand unit from the container.

4. The method of claim 1, wherein securing the container to the support assembly comprises magnetically securing a bottom of the container to the support assembly.

5. The method of claim 4, further comprising abutting the bottom of the container with the support assembly.

6. The method of claim 1, further comprising:
spraying, from a collar of the beverage preparation system, cleaning fluid against an outer surface of the wand unit, the collar positioned at an upper end of the wand unit;
flowing the cleaning fluid down at least a majority of the longitudinal length of the wand unit; and
receiving the cleaning fluid in a drain.

7. The method of claim 6, wherein spraying, from the collar of the beverage preparation system, cleaning fluid against the outer surface of the wand unit, comprises:
spraying, from a continuous annular gap of the collar, cleaning fluid against an outer surface of the wand unit.

8. The method of claim 6, wherein washing the container in the inverted position and with the container secured to the support assembly, comprises:
spraying cleaning fluid upwardly from nozzles embedded in a drain unit into the container.

9. The method of claim 1, further comprising determining, with a controller of the beverage preparation system, a location of the surface of the liquid in the container, wherein the controller comprises a processor and a memory.

10. The method of claim 9, wherein determining a location of the surface of the liquid in the container comprises:
receiving an identification input regarding the container; and
accessing a database of the beverage preparation system, the database comprising a cross-reference between the identification input and a corresponding location of the surface of the container.

11. The method of claim 1, further comprising:
controlling the orientation of the container relative to the support assembly.

12. The method of claim 11, wherein controlling the orientation of the container relative to the support assembly comprises:

controlling, with a physical interference of the container and the support assembly, the orientation of the container relative to the support assembly.

13. The method of claim 1, wherein securing the container to the support assembly comprises:
securing the container to the support assembly with one or more permanent magnets located on the container or the support assembly, the strength of the coupling being such that a user can readily overcome the coupling force.

14. The method of claim 1, wherein the container comprises a pitcher.

15. The method of claim 1, wherein the corresponding mating features comprise a first plurality of magnetic elements on the container and a second plurality of magnetic elements on the support assembly.

* * * * *